US008953130B2

(12) United States Patent
Nakamura (10) Patent No.: US 8,953,130 B2
(45) Date of Patent: Feb. 10, 2015

(54) LIQUID CRYSTAL DISPLAY DEVICE (75) Inventor: Masato Nakamura, Fukaya (JP)

(73) Assignee: Japan Display Inc., Tokyo (JP)

( * ) Notice: Subject to any disclaimer, the term of this patent is extended or adjusted under 35 U.S.C. 154(b) by 448 days.

(21) Appl. No.: 13/474,150

(22) Filed: May 17, 2012

(65) Prior Publication Data
US 2013/0016297 A1 Jan. 17, 2013

(30) Foreign Application Priority Data

Jul. 13, 2011 (JP) .................................. 2011-155150

(51) Int. Cl.
G02F 1/1343 (2006.01)
G02F 1/1337 (2006.01)

(52) U.S. Cl.
CPC .... *G02F 1/133707* (2013.01); *G02F 1/134363* (2013.01); *G02F 2001/134318* (2013.01)
USPC .......................................... 349/139; 349/146

(58) Field of Classification Search
None
See application file for complete search history.

(56) References Cited

U.S. PATENT DOCUMENTS

| | | | |
|---|---|---|---|
| 6,266,116 B1 | 7/2001 | Ohta et al. | |
| 2001/0010575 A1 | 8/2001 | Yoshida et al. | |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2007/0200990 A1* | 8/2007 | Hirosawa et al. ............. | 349/129 |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2009/0033815 A1* | 2/2009 | Lin et al. ......................... | 349/39 |
| 2009/0207363 A1* | 8/2009 | Hirosawa ....................... | 349/139 |
| 2010/0001973 A1* | 1/2010 | Hotelling et al. ............. | 345/174 |
| 2011/0234947 A1* | 9/2011 | Hirosawa ....................... | 349/139 |
| 2011/0234957 A1* | 9/2011 | Watanabe et al. ............. | 349/139 |

FOREIGN PATENT DOCUMENTS

| | | |
|---|---|---|
| JP | 6-222397 | 8/1994 |
| JP | 7-159807 | 6/1995 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 A | 1/2005 |
| JP | 3644653 | 2/2005 |
| JP | 2005-242307 A | 9/2005 |
| JP | 2009-192822 A | 8/2009 |

* cited by examiner

*Primary Examiner* — Richard Kim
*Assistant Examiner* — Ryan Crockett
(74) *Attorney, Agent, or Firm* — Oblon, Spivak, McClelland, Maier & Neustadt, L.L.P.

(57) ABSTRACT

According to one embodiment, a liquid crystal display device includes an insulation film disposed over a gate line, a storage capacitance line, a source line, and first main common electrodes disposed on the insulation film. The first main common electrodes include a discontinuous part in at least one of a first intersection part at an intersection between the storage capacitance line and the first source line and a second intersection part at an intersection between the storage capacitance line and the second source line. The liquid crystal display device also includes a main pixel electrode and a subpixel electrode which are disposed on the insulation film.

21 Claims, 7 Drawing Sheets

LIQUID CRYSTAL DISPLAY DEVICE

CROSS-REFERENCE TO RELATED APPLICATION

This application is based upon and claims the benefit of priority from Japanese Patent Application No. 2011-155150, filed Jul. 13, 2011; the entire contents of which are incorporated herein by reference.

FIELD

Embodiments described herein relate generally to the field of liquid crystal display devices.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

DETAILED DESCRIPTION

According to one embodiment, a liquid crystal display device comprises a first substrate including a first gate line and a second gate line that extend in a first direction, a storage capacitance line that extends in the first direction between the first gate line and the second gate line, a first source line and a second source line that extend in a second direction crossing the first direction, a switching element electrically connected to the first gate line and the first source line, an insulation film disposed over the first gate line, the second gate line, the storage capacitance line, the first source line, the second source line and the switching element, first main common electrodes disposed on the insulation film and opposed to the first source line and the second source line, the first main common electrodes extend in the second direction and include a discontinuous part in at least one of a first intersection part at an intersection between the storage capacitance line and the first source line and a second intersection part at an intersection between the storage capacitance line and the second source line, a main pixel electrode that extends in the second direction between the first main common electrodes on the insulation film and has a first width in the first direction, a sub-pixel electrode disposed on the insulation film and opposed to the storage capacitance line, the sub-pixel electrode is connected to the main pixel electrode and has a second width in the first direction that is greater than the first width, and a first alignment film covering the first main common electrodes, the main pixel electrode and the sub-pixel electrode; a second substrate including second main common electrodes opposed to the first main common electrodes, the second main common electrodes extend in the second direction and have a same potential as the first main common electrodes, and a second alignment film covering the second main common electrodes; and a liquid crystal layer held between the first substrate and the second substrate.

According to another embodiment, a liquid crystal display device comprises a first substrate including a switching element, an insulation film disposed over the switching element, a main pixel electrode having a first width in a first direction on the insulation film and extending in a second direction crossing the first direction, a sub-pixel electrode disposed on the insulation film, includes a first edge and a second edge that are opposed to each other, and has a second width in the first direction which is greater than the first width, the sub-pixel electrode being connected to the main pixel electrode, first main common electrodes disposed on the insulation film and extending in the second direction on both sides of the main pixel electrode, the first main electrodes including a discontinuous part facing at least one of the first edge and the second edge, and a first alignment film covering the first main common electrodes, the main pixel electrode and the sub-pixel electrode; a second substrate including second main common electrodes opposed to the first main common electrodes, the second main common electrodes extend in the second direction and have a same potential as the first main common electrodes, and a second alignment film covering the second main common electrodes; and a liquid crystal layer held between the first substrate and the second substrate.

According to another embodiment, a liquid crystal display device comprises a first substrate including a gate line and a storage capacitance line that extend in a first direction, a source line that extends in a second direction crossing the first direction, a switching element electrically connected to the gate line and the source line, an insulation film disposed over the switching element and in which a contact hole reaching the switching element is formed, a sub-pixel electrode disposed on the insulation film and opposed to the storage capacitance line, the sub-pixel electrode extending in the first direction and covering an entirety of the contact hole, a main pixel electrode that extends in the second direction on the insulation film and is connected to the sub-pixel electrode, a first main common electrode disposed on the insulation film and opposed to the source line, the first main common electrode extending in the second direction and including a discontinuous part at an intersection between the storage capacitance line and the source line, and a first alignment film covering the first main common electrode, the main pixel electrode and the sub-pixel electrode; a second substrate including a second main common electrode opposed to the first main common electrode, the second main common electrode extending in the second direction and having a same potential as the first main common electrode, and a second alignment film covering the second main common electrode; and a liquid crystal layer held between the first substrate and the second substrate, wherein a center of the contact hole is located between a center line of the main pixel electrode and the discontinuous part.

Embodiments will now be described in detail with reference to the accompanying drawings. In the drawings, structural elements having the same or similar functions are denoted by like reference numerals, and an overlapping description is omitted.

Figure 1:
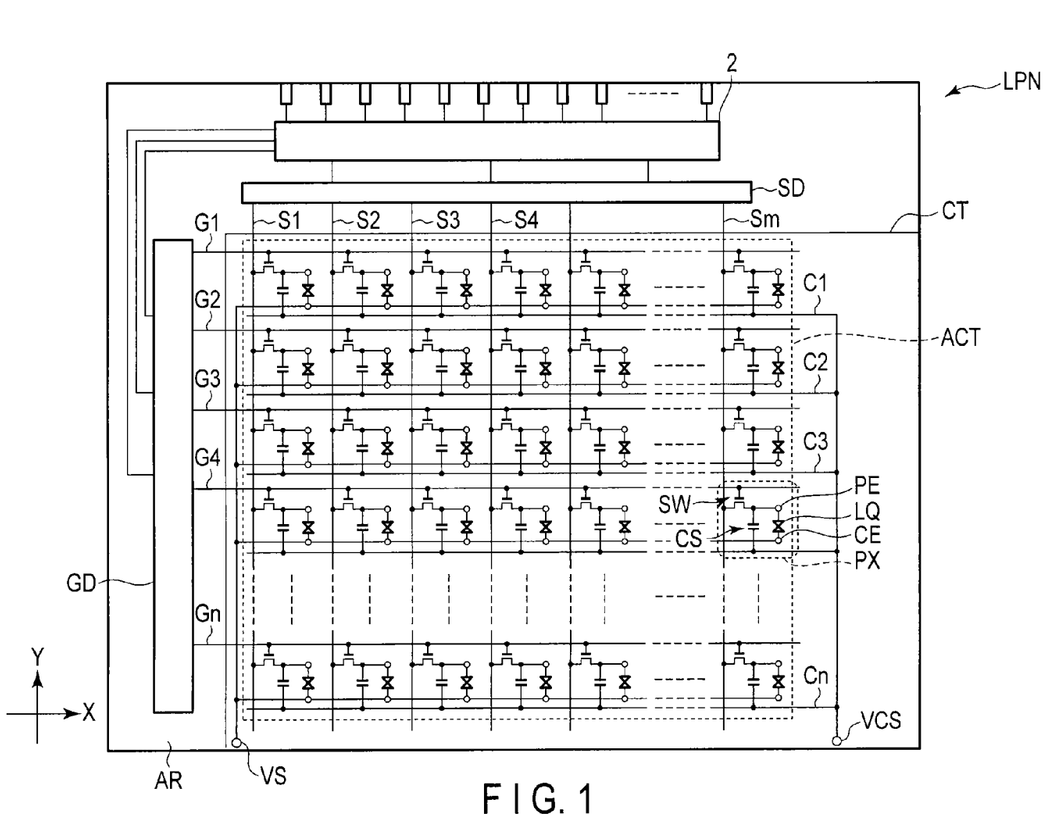
FIG. 1 is a view which schematically illustrates a structure and an equivalent circuit of a liquid crystal display device according to an embodiment.

FIG. 1 is a view which schematically shows a structure and an equivalent circuit of a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is disposed between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C extend substantially linearly, for example, in a first direction X. The gate lines G and storage capacitance lines C neighbor at intervals along a second direction Y crossing the first direction X, and are alternately arranged in parallel. In this example, the first direction X and the second direction Y are perpendicular to each other. The source lines S cross the gate lines G and storage capacitance lines C. The source lines S extend substantially linearly along the second direction Y. It is not always necessary that each of the gate lines G, storage capacitance lines C and source lines S extend linearly, and a part thereof may be bent.

Each of the gate lines G is led out to the outside of the active area ACT and is connected to a gate driver GD. Each of the source lines S is led out to the outside of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane which is defined by the first direction X and second direction Y, or to a substrate major surface of the array substrate AR or a substrate major surface of the counter-substrate CT (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon.

The pixel electrodes PE are disposed in the respective pixels PX, and are electrically connected to the switching elements SW. The common electrode CE has, for example, a common potential, and is disposed common to the pixel electrodes PE of plural pixels PX via the liquid crystal layer LQ. The pixel electrodes PE and common electrode CE are formed of a light-transmissive, electrically conductive material such as indium tin oxide (ITO) or indium zinc oxide (IZO). However, the pixel electrodes PE and common electrode CE may be formed of other metallic material such as aluminum.

The array substrate AR includes a power supply module VS for applying a voltage to the common electrode CE. The power supply module VS is formed, for example, on the outside of the active area ACT. The common electrode CE is led out to the outside of the active area ACT, and is electrically connected to the power supply module VS via an electrically conductive member (not shown).

Figure 2:
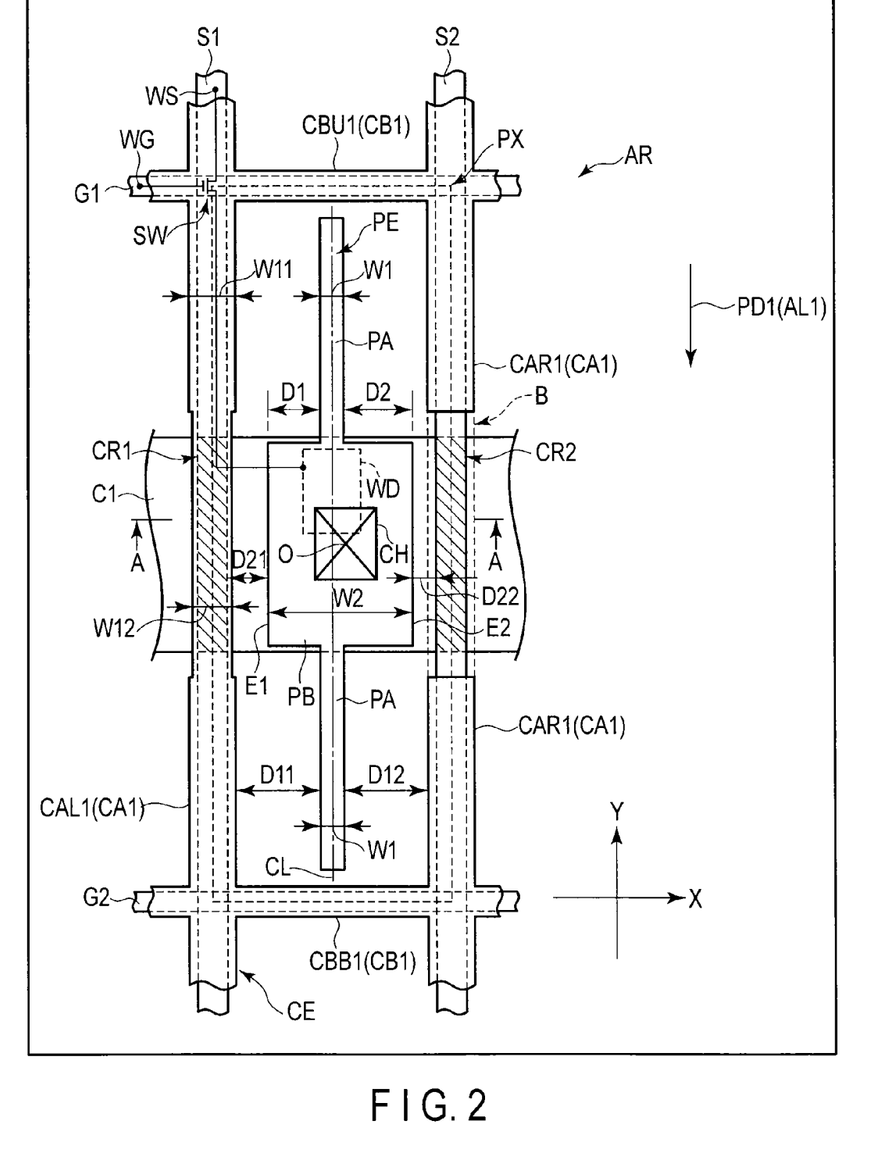
FIG. 2 is a plan view which schematically shows a structure example of a pixel at a time when an array substrate shown in FIG. 1 is viewed from a counter-substrate side.

FIG. 2 is a plan view which schematically shows a structure example of one pixel PX at a time when the liquid crystal display panel LPN shown in FIG. 1 is viewed from the counter-substrate side. FIG. 2 is a plan view in an X-Y plane.

The array substrate AR includes a gate line G1, a gate line G2, a storage capacitance line C1, a source line S1, a source line S2, a switching element SW, a pixel electrode PE, and a part of the common electrode CE.

The gate line G1, gate line G2 and storage capacitance line C1 extend in the first direction X. The source line S1 and source line S2 extend in the second direction Y. The storage capacitance line C1 is located at a substantially middle point between the gate line G1 and the gate line G2. Specifically, the distance between the gate line G1 and the storage capacitance line C1 in the second direction Y is substantially equal to the distance between the gate line G2 and the storage capacitance line C1 in the second direction Y.

In the example illustrated, the pixel PX corresponds to a grid region which is formed by the gate line G1, gate line G2, source line S1 and source line S2, as indicated by a broken line in FIG. 2. The pixel PX has a rectangular shape having a greater length in the second direction Y than in the first direction X. The length of the pixel PX in the first direction X corresponds to a pitch between the source line S1 and source line S2 in the first direction X. The length of the pixel PX in the second direction Y corresponds to a pitch between the gate line G1 and gate line G2 in the second direction Y. The pixel electrode PE is disposed between the source line S1 and source line S2 which neighbor each other. In addition, the pixel electrode PE is located between the gate line G1 and gate line G2.

In the example illustrated, in the pixel PX, the source line S1 is disposed at a left side end portion, the source line S2 is disposed at a right side end portion, the gate line G1 is disposed at an upper side end portion, and the gate line G2 is disposed at a lower side end portion. Strictly speaking, the source line S1 is disposed to extend over a boundary between the pixel PX and a pixel neighboring on the left side, the source line S2 is disposed to extend over a boundary between the pixel PX and a pixel neighboring on the right side, the gate line G1 is disposed to extend over a boundary between the pixel PX and a pixel neighboring on the upper side, and the gate line G2 is disposed to extend over a boundary between the pixel PX and a pixel neighboring on the lower side. The storage capacitance line C1 is disposed at a substantially central part of the pixel PX. A region where the storage capacitance line C1 and the source line S1 cross (i.e., an intersection between the storage capacitance line C1 and the source line S1) is a first intersection part CR1, and a region where the storage capacitance line C1 and the source line S2 cross is a second intersection part CR2. The first intersection part CR1 and second intersection part CR2 are regions indicated by hatching lines in FIG. 2.

A switching element SW in the illustrated example is electrically connected to the gate line G1 and source line S1. The switching element SW is provided at an intersection between the gate line G1 and source line S1. A gate electrode WG of the switching element SW is electrically connected to the gate line G1, and a source electrode WS of the switching element SW is electrically connected to the source line S1. A drain electrode WD of the switching element SW is formed to extend along the source line S1 and storage capacitance line C1, and is electrically connected to the pixel electrode PE via a contact hole CH formed in an area overlapping the storage capacitance line C1. The switching element SW is provided in an area overlapping the source line S1 and storage capacitance line C1, and does not substantially protrude from the area overlapping the source line S1 and storage capacitance line C1, thus suppressing a decrease in area of an aperture portion which contributes to display.

The pixel electrode PE includes a main pixel electrode PA and a sub-pixel electrode PB. The main pixel electrode PA and sub-pixel electrode PB are formed to be integral or continuous, and are electrically connected to each other. In the meantime, in the example illustrated, only the pixel electrode PE which is disposed in one pixel PX is shown, but pixel electrodes of the same shape are disposed in other pixels, the depiction of which is omitted.

The main pixel electrode PA linearly extends in the second direction Y, between the source line S1 and source line S2, from the sub-pixel electrode PB to the vicinity of the upper side end portion of the pixel PX and to the vicinity of the lower side end portion of the pixel PX. The main pixel electrode PA is formed in a strip shape having a substantially equal width W1 along the first direction X.

The sub-pixel electrode PB linearly extends in the first direction X from the main pixel electrode PA toward the source line S1 and source line S2. The sub-pixel electrode PB is disposed at a region which is opposed to the storage capacitance line C1, and is electrically connected to the drain electrode WD of the switching element SW via the contact hole CH. The sub-pixel electrode PB is formed in a strip shape with a width W2 which is greater than the width W1 of the main pixel electrode PA. Specifically, the sub-pixel electrode PB has a first edge E1 and a second edge E2 which are opposed with the width W2. The first edge E1 and second edge E2 extend in the second direction Y. The first edge E1 is located on the side facing the source line S1. The second edge E2 is located on the side facing the source line S2. The sub-pixel electrode PB is located between the first intersection part CR1 and second intersection part CR2.

In the example illustrated, the main pixel electrode PA is located at a central part of the pixel PX. On the other hand, the sub-pixel electrode PB is displaced from central part of the pixel PX toward the source line S2. A distance D1 in the first direction X from the first edge E1 of the sub-pixel electrode PB to the main pixel electrode PA is less than a distance D2 in the first direction X from the second edge E2 of the sub-pixel electrode PB to the main pixel electrode PA.

The common electrode CE includes first main common electrodes CA1 and first sub-common electrodes CB1 on the array substrate AR. The first main common electrodes CA1 and first sub-common electrodes CB1 are formed to be integral or continuous with each other, and are electrically connected to each other. Specifically, the first main common electrodes CA1 and first sub-common electrodes CB1 are disposed in a manner to surround the pixel electrode PE, and are spaced a part from the pixel electrode PE.

The first main common electrodes CA1 extend, in the X-Y plane, linearly in the second direction Y that is substantially parallel to the main pixel electrode PA, on both sides of the main pixel electrode PA. Alternatively, the first main common electrodes CA1 are opposed to the source lines S and extend substantially in parallel to the main pixel electrode PA. The first main common electrode CA1 is formed in a strip shape having a substantially equal width in the first direction X. In the example illustrated, however, the first main common electrode CA1 has a line width W11 in the first direction X at a position where the first main common electrode CA1 is disposed along the main pixel electrode PA, but the first main common electrode CA1 has a line width W12, which is less than the line width W11, in the first direction X at a position where the first main common electrode CA1 is disposed along the sub-pixel electrode PB.

In addition, the first main common electrode CA1 is discontinuous at a position facing at least one of the first edge E1 and second edge E2, on both sides of the sub-pixel electrode PB. Specifically, the first main common electrode CA1 includes a gap called a discontinuous part B facing at least one of the first edge E1 and second edge E2. In other words, the first main common electrode CA1 is discontinuous, and not present, in the region of at least one of the first intersection part CR1 and second intersection part CR2. Specifically, the first main common electrode CA1 includes the discontinuous part B which is opposed to at least one of the first intersection part CR1 and second intersection part CR2.

In the example illustrated, two first main common electrodes CA1 are arranged in parallel with a distance in the first direction X, and are located at left and right end portions of the pixel PX, respectively. In the description below, in order to distinguish these first main common electrodes CA1, the first main common electrode on the left side in FIG. 2 is referred to as "CAL1", and the first main common electrode on the right side in FIG. 2 is referred to as "CAR1". In the pixel PX, the first main common electrode CAL1 is disposed at the left side end portion of the pixel PX, and the first main common electrode CAR1 is disposed at the right side end portion of the pixel PX. Strictly speaking, the first main common electrode CAL1 is disposed to extend over a boundary between the pixel PX and a pixel neighboring on the left side, and the first main common electrode CAR1 is disposed to extend over a boundary between the pixel PX and a pixel neighboring on the right side.

The first main common electrode CAL1 is formed at a position along the main pixel electrode PA, faces the first edge E1, and is opposed to the source line S1, without being discontinuous at an intermediate portion thereof. Specifically, the first main common electrode CAL1 is continuously formed along the second direction Y, and extends through the first intersection part CR1. The first main common electrode CAR1 is discontinuous at a position facing the second edge E2, and is opposed to the source line S2 at the other positions including the position along the main pixel electrode PA. Specifically, the first main common electrode CAR1 is discontinuously formed along the second direction Y, and the discontinuous part B is arranged at the second intersection part CR2. The first main common electrode CAL1 and first main common electrode CAR1 are continuous with the first sub-common electrodes CB1 in the vicinities of intersections with the gate lines.

The first sub-common electrodes CB1 extend, in the X-Y plane, linearly in the first direction X that is substantially parallel to the sub-pixel electrode PB, on both sides of the sub-pixel electrode PB. Alternatively, the first sub-common electrodes CB1 are opposed to the gate lines G and extend substantially in parallel to the sub-pixel electrode PB. The first sub-common electrode CB1 is formed in a strip shape. The width in the second direction Y of the first sub-common electrode CB1 may not necessarily be uniform. In addition, the first sub-common electrodes CB1 are formed integral or continuous with the first main common electrodes CA1, and are electrically connected to the first main common electrodes CA1. Specifically, the first sub-common electrodes CB1 have the same potential as the first main common electrodes CA1.

In the example illustrated, two first sub-common electrodes CB1 are arranged in parallel with a distance in the second direction Y, and are disposed at upper and lower end portions of the pixel PX, respectively. In the description below, in order to distinguish these first sub-common electrodes CB1, the first sub-common electrode on the upper side in FIG. 2 is referred to as "CBU1", and the first sub-common electrode on the lower side in FIG. 2 is referred to as "CBB1". The first sub-common electrode CBU1 is opposed to the gate line G1, without being discontinuous at an intermediate part thereof. The first sub-common electrode CBB1 is opposed to the gate line G2, without being discontinuous at an intermediate part thereof.

In the pixel PX, the first sub-common electrode CBU1 is disposed at the upper side end portion of the pixel PX, and the first sub-common electrode CBB1 is disposed at the lower side end portion of the pixel PX. Strictly speaking, the first sub-common electrode CBU1 is disposed to extend over a boundary between the pixel PX and a pixel neighboring on the upper side, and the first sub-common electrode CBB1 is disposed to extend over a boundary between the pixel PX and a pixel neighboring on the lower side.

Paying attention to the positional relationship between the pixel electrode PE and the common electrode CE, the following relationship is established.

In the X-Y plane, the main pixel electrode PA and the first main common electrodes CA1 are alternately arranged along the first direction X. The main pixel electrode PA and the first main common electrodes CA1 are arranged substantially parallel to each other. In this case, in the X-Y plane, neither of the first main common electrodes CA1 overlaps the pixel electrode PE. Specifically, one main pixel electrode PA is located between the first main common electrode CAM and first main common electrode CAR1 which neighbor each other. In other words, the first main common electrode CAL' and first main common electrode CAR1 are disposed on both sides of the main pixel electrode PA. Alternatively, the main pixel electrode PA is disposed between the first main common electrode CAL1 and first main common electrode CAR1. Thus, the first main common electrode CAL1, main pixel electrode PA and first main common electrode CAR1 are arranged in the named order along the first direction X.

The distance in the first direction X from the main pixel electrode PA to the first main common electrode CA1 located on one of both sides of the main pixel electrode PA is substantially equal to the distance in the first direction X from the main pixel electrode PA to the first main common electrode CA1 located on the other of both sides of the main pixel electrode PA. Specifically, a distance D11 between the first main common electrode CAL1 and the main pixel electrode PA in the first direction X is substantially equal to a distance D12 between the first main common electrode CAR1 and the main pixel electrode PA in the first direction X.

In the X-Y plane, the sub-pixel electrode PB and the first sub-common electrodes CB1 are alternately arranged along the second direction Y. The sub-pixel electrode PB and the first sub-common electrodes CB1 are arranged substantially parallel to each other. In this case, in the X-Y plane, neither of the first sub-common electrodes CB1 overlaps the pixel electrode PE. Specifically, one sub-pixel electrode PB is located between the first sub-common electrode CBU1 and first sub-common electrode CBB1 which neighbor each other. In other words, the first sub-common electrode CBU1 and first sub-common electrode CBB1 are disposed on both sides of the sub-pixel electrode PB. Alternatively, the sub-pixel electrode PB is disposed between the first sub-common electrode CBU1 and first sub-common electrode CBB1. Thus, the first sub-common electrode CBB1, sub-pixel electrode PB and first sub-common electrode CBU1 are arranged in the named order along the second direction Y.

A distance D21 from the sub-pixel electrode PB to the first intersection part CR1 (or the edge of the source line S1) in the first direction X is greater than a distance D22 from the sub-pixel electrode PB to the second intersection part CR2 (or the edge of the source line S2) in the first direction X.

Specifically, the sub-pixel electrode PB is disposed near the discontinuous part B, and is disposed away from the first intersection part CR1. In addition, the contact hole CH for connecting the sub-pixel electrode PB and the drain electrode of the switching element SW is entirely covered with the sub-pixel electrode PB. Moreover, the contact hole CH is disposed toward the discontinuous part B in the region overlapping the storage capacitance line C1. Specifically, a center O of the contact hole CH is displaced toward the discontinuous part B from a center line CL of the main pixel electrode PA (i.e. the center line of the pixel PX). In other words, the center O of the contact hole CH is located between the center line CL and the discontinuous part B.

If the sub-pixel electrode PB is disposed as described above, it is possible to prevent short-circuit between electrodes which are provided in the same layer and have different electrical signals, such as the sub-pixel electrode PB and the first main common electrode CAL1. Specifically, by providing the discontinuous part B, an allowance can be provided between the pixel electrode PE and the common electrode CE, and therefore the manufacturing yield can be improved. In particular, in the case where the size of the contact hole CH cannot be decreased in accordance with the size of the pixel PX for reasons concerning fabrication, with the development in microfabrication with narrower distances between pixels PX, the ratio in size of the contact hole CH to the pixel PX increases. In addition, in order to decrease the contact resistance between the drain electrode WD and the pixel electrode PE and to prevent corrosion of the electrodes, it is necessary to cover the entirety of the contact hole CH with the pixel electrode PE. Accordingly, the minimum size of the sub-pixel electrode PB is restricted by the size of the contact hole CH. Thus, if the distance between the sub-pixel electrode PB and the first main common electrode CAL1 has no sufficient allowance, a part between the sub-pixel electrode PB and the first main common electrode CAL1 cannot be etched away at the time of manufacture, and there is concern that short-circuit occurs between the sub-pixel electrode PB and the first main common electrode CAL. However, according to the present embodiment, the center of the contact hole CH is located between the center line CL of the pixel PX and the discontinuous part B. Thereby, even if the sub-pixel electrode PB covers the contact hole CH, a distance enough to avoid short-circuit can be secured between the first main common electrode CAL1 and the pixel electrode PE.

The pixel electrode PE, first main common electrodes CA1 and first sub-common electrodes CB1, which are shown in FIG. 2, are covered with a first alignment film Al1.

Figure 3:
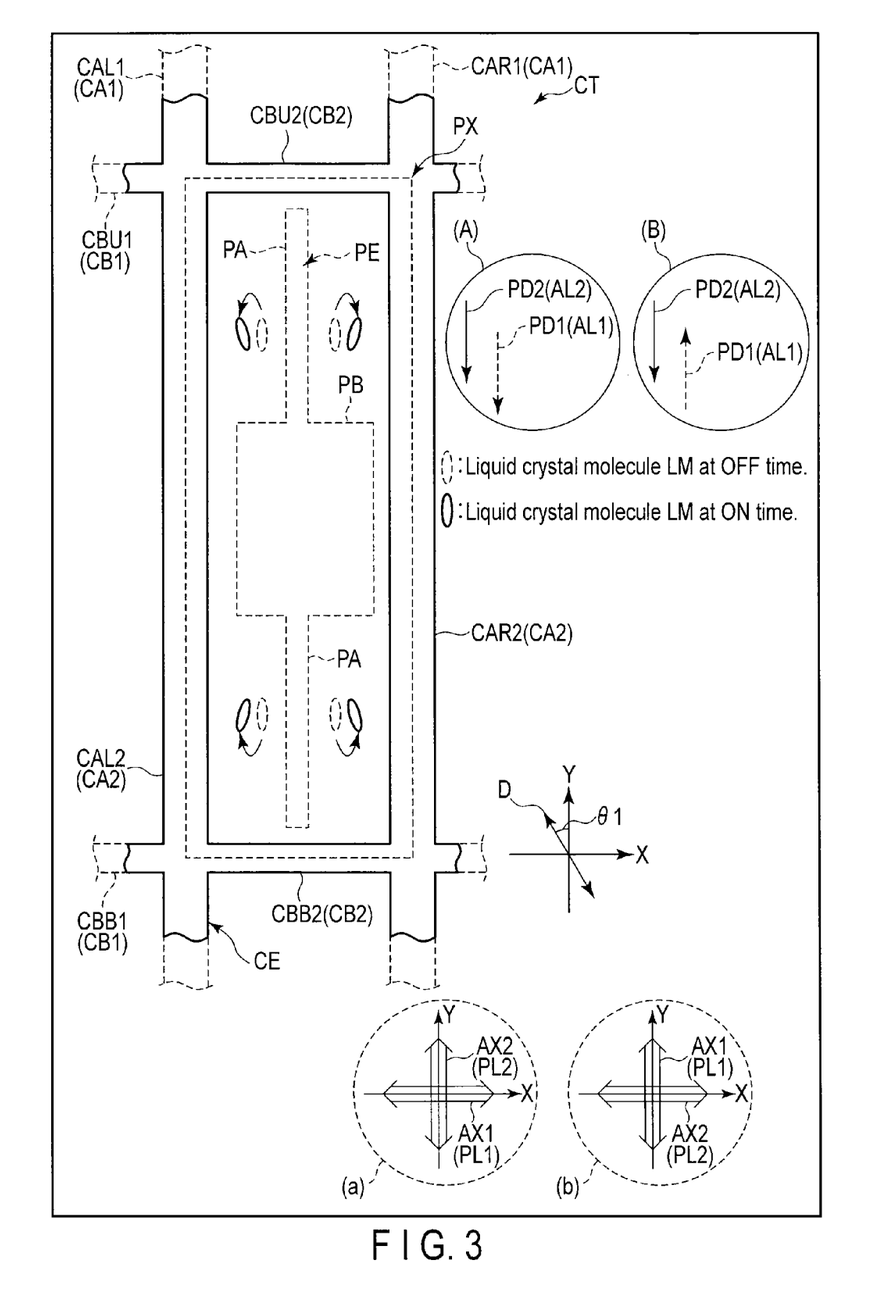
FIG. 3 is a plan view which schematically shows a structure example of a pixel in the counter-substrate shown in FIG. 1.

FIG. 3 is a plan view which schematically shows a structure example of one pixel PX in the counter-substrate shown in FIG. 1. FIG. 3 is a plan view in the X-Y plane. FIG. 3 shows only parts which are necessary for the description, and indicates, by broken lines, the pixel electrode PE, first main common electrodes CA1 and first sub-common electrodes CB1 which are provided on the array substrate.

The common electrode CE includes second main common electrodes CA2 and second sub-common electrodes CB2 on the counter-substrate CT. The second main common electrodes CA2 and second sub-common electrodes CB2 are electrically connected to the first main common electrodes CA1 and first sub-common electrodes CB1 provided on the array substrate, for example, on the outside of the active area. Specifically, the second main common electrodes CA2 and second sub-common electrodes CB2 have the same potential as the first main common electrodes CA1 and first sub-common electrodes CB1.

The second main common electrodes CA2 extend, in the X-Y plane, linearly in the second direction Y that is substantially parallel to the main pixel electrode PA, on both sides of the main pixel electrode PA. Alternatively, the second main common electrodes CA2 are opposed to the first main common electrodes CA1 and extend substantially in parallel to the main pixel electrode PA. The second main common electrode CA2 is formed in a strip shape having a substantially equal width in the first direction X.

In the example illustrated, two second main common electrodes CA2 are arranged in parallel with a distance in the first direction X, and are located at left and right end portions of the pixel PX, respectively. In the description below, in order to distinguish these second main common electrodes CA2, the second main common electrode on the left side in FIG. 3 is referred to as "CAL2", and the second main common electrode on the right side in FIG. 3 is referred to as "CAR2". The second main common electrode CAL2 is opposed to the first main common electrode CAL1, without being discontinuous at an intermediate portion thereof. The second main common electrode CAR2 is opposed to the first main common electrode CAR1, without being discontinuous at an intermediate portion thereof.

In the pixel PX, the second main common electrode CAL2 is disposed at the left side end portion of the pixel PX, and the second main common electrode CAR2 is disposed at the right side end portion of the pixel PX. Strictly speaking, the second main common electrode CAL2 is disposed to extend over a boundary between the pixel PX and a pixel neighboring on the left side, and the second main common electrode CAR2 is disposed to extend over a boundary between the pixel PX and a pixel neighboring on the right side.

The second sub-common electrodes CB2 extend, in the X-Y plane, linearly in the first direction X that is substantially parallel to the sub-pixel electrode PB, on both sides of the sub-pixel electrode PB. Alternatively, the second sub-common electrodes CB2 are opposed to the first sub-common electrodes CB1 and extend substantially in parallel to the sub-pixel electrode PB. The second sub-common electrode CB2 is formed in a strip shape having a substantially equal width in the second direction Y. In addition, the second sub-common electrodes CB2 are formed integral or continuous with the second main common electrodes CA2, and are electrically connected to the second main common electrodes CA2. Specifically, in the counter-substrate CT, the common electrode CE is formed in a grid shape.

In the example illustrated, two second sub-common electrodes CB2 are arranged in parallel with a distance in the second direction Y, and are disposed at upper and lower end portions of the pixel PX, respectively. In the description below, in order to distinguish these second sub-common electrodes CB2, the second sub-common electrode on the upper side in FIG. 3 is referred to as "CBU2", and the second sub-common electrode on the lower side in FIG. 3 is referred to as "CBB2". The second sub-common electrode CBU2 is opposed to the first sub-common electrode CBU1, without being discontinuous at an intermediate part thereof. The second sub-common electrode CBB2 is opposed to the first sub-common electrode CBB1, without being discontinuous at an intermediate part thereof.

In the pixel PX, the second sub-common electrode CBU2 is disposed at the upper side end portion of the pixel PX, and the second sub-common electrode CBB2 is disposed at the lower side end portion of the pixel PX. Strictly speaking, the second sub-common electrode CBU2 is disposed to extend over a boundary between the pixel PX and a pixel neighboring on the upper side, and the second sub-common electrode CBB2 is disposed to extend over a boundary between the pixel PX and a pixel neighboring on the lower side.

Each of the second main common electrodes CA2 and second sub-common electrodes CB2, which are shown in FIG. 3, is covered with a second alignment film AL2.

Figure 4:
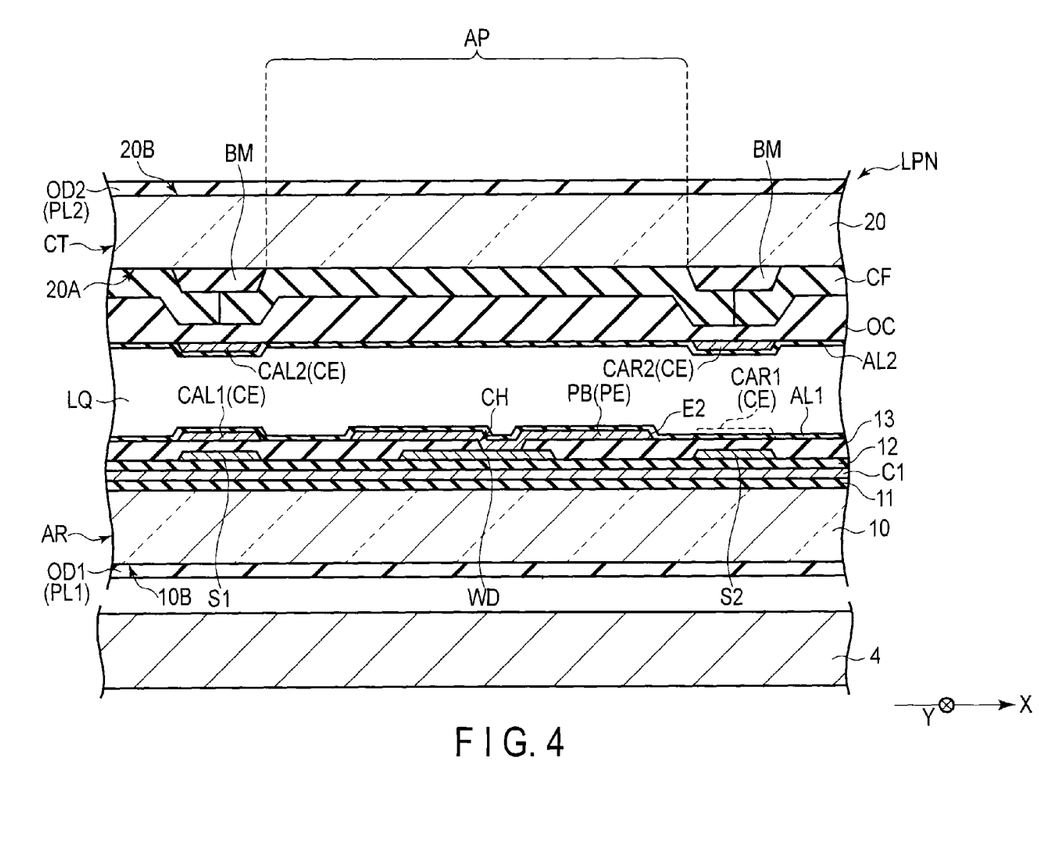
FIG. 4 is a schematic cross-sectional view, taken along line A-A in FIG. 2, showing a cross-sectional structure of a liquid crystal display panel shown in FIG. 2.

FIG. 4 is a schematic cross-sectional view, taken along line A-A in FIG. 2, showing a cross-sectional structure of the liquid crystal display panel LPN shown in FIG. 2. FIG. 4 shows only parts which are necessary for the description.

A backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

The array substrate AR is formed by using a first insulative substrate 10 having light transmissivity. A storage capacitance line C1, which extends in the first direction X, is formed on a first insulation film 11, and is covered with a second insulation film 12. Gate lines, which are not shown, are similarly disposed between the first insulation film 11 and second insulation film 12.

A drain electrode WD of the switching element, a source line S1 and a source line S2 are formed on the second insulation film 12 and are covered with a third insulation film 13. The drain electrode WD is spaced apart from the source line S1 and source line S2 and is located between the source line S1 and source line S2. A contact hole CH, which penetrates to the drain electrode WD, is formed in the third insulation film 13.

The sub-pixel electrode PB of the pixel electrode PE, and the first main common electrodes CAL1 and first sub-common electrodes CAR1 of the common electrode CE are formed on an upper surface of the same insulation film, that is, an upper surface of the third insulation film 13, and are mutually spaced apart. The sub-pixel electrode PB extends over the contact hole CH and is electrically connected to the drain electrode WD. The sub-pixel electrode PB is located on the inside of a position immediately above each of the neighboring source line S1 and source line S2, but the sub-pixel electrode PB is positioned closer to the source line S2 than to the source line S1. Specifically, the sub-pixel electrode PB is located between the first main common electrode CAL1 which is located immediately above the source line S1 and the first main common electrode CAR1 which is located immediately above the source line S2, but the sub-pixel electrode PB is positioned closer to the first main common electrode CAR1 than to the first main common electrode CAL1. However, as indicated by a broken line in FIG. 4, the first main common electrode CAR1 is discontinuous at a position facing the second edge E2 of the sub-pixel electrode PB.

A first alignment film AL1 is disposed on that surface of the array substrate AR, which is opposed to the counter-substrate CT, and the first alignment film AL1 extends over substantially the entirety of the active area ACT. The first alignment film AL1 covers the pixel electrode PE including the sub-pixel electrode PB, the first main common electrode CAL1 and the first main common electrode CAR1, and is also disposed over the third insulation film 13. The first alignment film AL1 is formed of a material which exhibits horizontal alignment properties.

The counter-substrate CT is formed by using a second insulative substrate 20 having light transmissivity. The counter-substrate CT includes a black matrix BM, a color filter CF, an overcoat layer OC, a common electrode CE, and a second alignment film AL2.

The black matrix BM partitions the pixels PX and forms aperture portions AP which are opposed to the pixel electrodes PE. Specifically, the black matrix BM is disposed so as to be opposed to wiring portions, such as the source lines S, gate lines, storage capacitance lines, and switching elements. In this example, only those portions of the black matrix BM, which extend in the second direction Y, are depicted, but the black matrix BM may include portions extending in the first direction X. The black matrix BM is disposed on an inner surface 20A of the second insulative substrate 20, which is opposed to the array substrate AR.

The color filter CF is disposed in association with each pixel PX. Specifically, the color filter CF is disposed in the aperture portion AP on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter, which is formed of a resin material that is colored in red, is disposed in association with a red pixel. A blue color filter, which is formed of a resin material that is colored in blue, is disposed in association with a blue pixel. A green color filter, which is formed of a resin material that is colored in green, is disposed in association with a green pixel. Boundaries between these color filters CF are located at positions overlapping the black matrix BM. The overcoat layer OC covers the color filters CF.

The overcoat layer OC reduces the effect of asperities on the surface of the color filters CF. The overcoat layer OC is formed of, for example, a transparent resin material.

The second main common electrode CAL2 and second main common electrode CAR2 of the common electrode are formed on that side of the overcoat layer OC, which is opposed to the array substrate AR. The second main common electrode CAL2 is located immediately above the first main common electrode CAL1. The second main common electrode CAR2 is located immediately above the first main common electrode CAR1.

The second alignment film AL2 is disposed on that surface of the counter-substrate CT, which is opposed to the array substrate AR, and the second alignment film AL2 extends over substantially the entirety of the active area ACT. The second alignment film AL2 covers the second common electrode CRL2, second common electrode CAR2 and overcoat layer OC. The second alignment film AL2 is formed of a material which exhibits horizontal alignment properties.

The first alignment film AL1 and second alignment film AL2 are subjected to alignment treatment (e.g. rubbing treatment or optical alignment treatment) for initially aligning the liquid crystal molecules of the liquid crystal layer LQ. A first alignment treatment direction PD1, in which the first alignment film AL1 initially aligns the liquid crystal molecules, is parallel to a second alignment treatment direction PD2, in which the second alignment film AL2 initially aligns the liquid crystal molecules. In an example shown in part (A) of FIG. 3, the first alignment treatment direction PD1 and second alignment treatment direction PD2 are parallel to each other and are identical. In an example shown in part (B) of FIG. 3, the first alignment treatment direction PD1 and second alignment treatment direction PD2 are parallel to each other and are opposite to each other.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 μm, is created. The array substrate AR and counter-substrate CT are attached by a sealant on the outside of the active area ACT in the state in which the predetermined cell gap is created therebetween.

The liquid crystal layer LQ is held in the cell gap which is created between the array substrate AR and the counter-substrate CT, and is disposed between the first alignment film AL1 and second alignment film AL2. The liquid crystal layer LQ includes liquid crystal molecules LM. The liquid crystal layer LQ is composed of a liquid crystal material having a positive (positive-type) dielectric constant anisotropy.

A first optical element OD1 is attached by, e.g. an adhesive, to an outer surface of the array substrate AR, that is, an outer surface 10B of the first insulative substrate 10 which constitutes the array substrate AR. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis (or first absorption axis) AX1. In the meantime, another optical element, such as a retardation plate, may be disposed between the first polarizer PL1 and the first insulative substrate 10.

A second optical element OD2 is attached by, e.g. an adhesive, to an outer surface of the counter-substrate CT, that is, an outer surface 20B of the second insulative substrate 20 which constitutes the counter-substrate CT. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis (or second absorption axis) AX2. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a positional relationship of crossed Nicols. In this case, one of the polarizers is disposed such that the polarization axis thereof is parallel or perpendicular to an initial alignment direction of liquid crystal molecules LM, that is, the first alignment treatment direction PD1 or second alignment treatment direction PD2. When the initial alignment direction is parallel to the second direction Y, the polarization axis of one polarizer is parallel to the second direction Y or is parallel to the first direction X.

In an example shown in part (a) of FIG. 3, the first polarizer PL1 is disposed such that the first polarization axis AX1 thereof is perpendicular to the initial alignment direction (second direction Y) of liquid crystal molecules LM, and the second polarizer PL2 is disposed such that the second polarization axis AX2 thereof is parallel to the initial alignment direction of liquid crystal molecules LM. In addition, in an example shown in part (b) of FIG. 3, the second polarizer PL2 is disposed such that the second polarization axis AX2 thereof is perpendicular to the initial alignment direction (second direction Y) of liquid crystal molecules LM, and the first polarizer PL1 is disposed such that the first polarization axis AX1 thereof is parallel to the initial alignment direction of liquid crystal molecules LM.

Next, the operation of the liquid crystal display panel LPN having the above-described structure is described with reference to FIG. 2 to FIG. 4.

Specifically, in a state in which no voltage is applied to the liquid crystal layer LQ, that is, in a state (OFF time) in which no electric field is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM corresponds to a direction in which the major axis of the liquid crystal molecule LM at the OFF time is orthogonally projected onto the X-Y plane. In the description below, for the purpose of simplicity, it is assumed that the liquid crystal molecule LM is aligned in parallel to the X-Y plane, and the liquid crystal molecule LM rotates in a plane parallel to the X-Y plane.

In this case, each of the first alignment treatment direction PD1 and the second alignment treatment direction PD2 is substantially parallel to the second direction Y. At the OFF time, the liquid crystal molecule LM is initially aligned such that the major axis thereof is substantially parallel to the second direction Y, as indicated by a broken line in FIG. 3. Specifically, the initial alignment direction of the liquid crystal molecule LM is parallel to the second direction Y (or 0' to the second direction Y).

When the first alignment treatment direction PD1 and the second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM are aligned with such pre-tilt angles that the liquid crystal molecules LM become symmetric in the vicinity of the first alignment film AL1 and in the vicinity of the second alignment film AL2, with respect to the middle part as the boundary (splay alignment). In the state in which the liquid crystal molecules LM are splay-aligned, optical compensation can be made by the liquid crystal molecules LM in the vicinity of the first alignment film AL1 and the liquid crystal molecules LM in the vicinity of the second alignment film AL2, even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be improved.

In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of light from the backlight 4 passes through the first polarizer PL1 and enters the liquid crystal display panel LPN. The polarization state of the light, which enters the liquid crystal display panel LPN, is linear polarization perpendicular to the first polarization axis AX1 of the first polarizer PL1. The polarization state of such linear polarization hardly varies when the light passes through the liquid crystal display panel LPN at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which a potential difference is produced between the pixel electrode PE and common electrode CE, a lateral electric field (or an oblique electric field), which is substantially parallel to the substrates, is produced between the pixel electrode PE and the common electrode CE. The liquid crystal molecules LM are affected by the electric field, and the major axes thereof rotate within a plane which is parallel to the X-Y plane, as indicated by solid lines in the Figure.

In the example shown in FIG. 3, the liquid crystal molecule LM in a region surrounded by the pixel electrode PE, second main common electrode CAL2 and second sub-common electrode CBB2 rotates clockwise relative to the second direction Y, and is aligned in a lower left direction in the Figure. The liquid crystal molecule LM in a region surrounded by the pixel electrode PE, second main common electrode CAR2 and second sub-common electrode CBB2 rotates counterclockwise relative to the second direction Y, and is aligned in a lower right direction in the Figure. The liquid crystal molecule LM in a region surrounded by the pixel electrode PE, second main common electrode CAL2 and second sub-common electrode CBU2 rotates counter-clockwise relative to the second direction Y, and is aligned in an upper left direction in the Figure. The liquid crystal molecule LM in a region surrounded by the pixel electrode PE, second main common electrode CAR2 and second sub-common electrode CBU2 rotates clockwise relative to the second direction Y, and is aligned in an upper right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the pixel electrode PE, and domains are formed in the respective alignment directions. Specifically, a plurality of domains is formed in one pixel PX.

At such ON time, linearly polarized light perpendicular to the first polarization axis AX1 of the first polarizer PL1 enters the liquid crystal display panel LPN, and the polarization state of the light varies depending on the alignment state of the liquid crystal molecules LM when the light passes through the liquid crystal layer LQ. At the ON time, at least part of the light emerging from the liquid crystal layer LQ passes through the second polarizer PL2 (white display).

According to the present embodiment, the array substrate AR includes the first main common electrodes CA1 which are located on both sides of the main pixel electrode PA and are discontinuous on at least one of both sides of the sub-pixel electrode PB. Thus, even if the width in the first direction X of the sub-pixel electrode PB increases or the width in the first direction X of the pixel PX decreases, it is possible to sufficiently secure a horizontal inter-electrode distance between the sub-pixel electrode PB with a pixel potential and the first main common electrode CA1 with a common potential. Therefore, it is possible to suppress the occurrence of a display defect due to short-circuit between the pixel electrode PE and the common electrode CE. In addition, it is possible to adapt to a narrow pixel pitch in a case where the pixel pitch in the first direction X is decreased, and microfabrication with higher fineness can be achieved.

Furthermore, since the first main common electrode CA1 is opposed to the source line S, an undesired electric field from the source line S can be shielded. It is thus possible to suppress application of an undesired bias from the source line S to the liquid crystal layer LQ, and to suppress the occurrence of a display defect such as crosstalk (e.g. a phenomenon that when a pixel potential for displaying white is supplied to the source line that is connected to the pixel PX in the state in which the pixel PX is set at a pixel potential for displaying black, light leaks from a part of the pixel PX and the brightness increases). Therefore, a liquid crystal display device with a good display quality can be provided. In the meantime, in order to improve the capability of shielding an electric field from the source line S, it is desirable that the width in the first direction X of the first main common electrode CA1 be set to be greater than the width in the first direction X of the source line S.

Since the first sub-common electrode CB1 is opposed to the gate line G, an undesired electric field from the gate line G can be shielded. It is thus possible to suppress application of an undesired bias from the gate line G to the liquid crystal layer LQ, and to suppress the occurrence of a display defect such as burn-in, and the occurrence of light leakage due to an alignment defect of liquid crystal molecules. Therefore, a liquid crystal display device with a good display quality can be provided. In the meantime, in order to improve the capability of shielding an electric field from the gate line G, it is desirable that the width in the second direction Y of the first sub-common electrode CB1 be set to be greater than the width in the second direction Y of the gate line G.

Moreover, since the first main common electrodes CA1 and first sub-common electrodes CB1 are electrically connected and formed in a substantially grid-like shape, redundancy can be improved. Accordingly, even if undesired breakage occurs in a part of the common electrode CE that is provided on the array substrate AR, the common potential can stably be supplied to each pixel PX, and the occurrence of a display defect can be suppressed.

Besides, since the first main common electrodes CA1 and first sub-common electrodes CB1 are electrically connected, the same common potential can be supplied to the pixels which neighbor in the first direction X and to the pixels which neighbor in the second direction Y, and the influence of an electric field from the gate line G and source line S can be reduced. In addition, when use is made of a driving method, such as HV inversion driving or V line inversion driving, in which the common potential that is applied to the common electrode is DC, the occurrence of a display defect can be suppressed.

Moreover, according to the present embodiment, a high transmittance can be obtained in the inter-electrode gap between the pixel electrode PE and the common electrode CE. Thus, a transmittance per pixel can sufficiently be increased by increasing the inter-electrode distance between the pixel electrode PE, on the one hand, and the main common electrode CAL and main common electrode CAR, on the other hand. As regards product specifications in which the pixel pitch is different, the peak condition of the transmittance distribution can be used by varying the inter-electrode distance (e.g. by varying the position of disposition of the main common electrode CA in relation to the main pixel electrode PA that is disposed at a substantially central part of the pixel PX). Specifically, in the display mode of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch. Therefore, requirements for high transmittance and high resolution can easily be realized.

According to the present embodiment, the transmittance is sufficiently lowered in the region overlapping the black matrix BM. The reason for this is that the electric field does not leak to the outside of the pixel from the position of the common electrode CE, and an undesired lateral electric field does not occur between pixels which neighbor each other with the black matrix BM interposed, and therefore the liquid crystal molecules in the region overlapping the black matrix BM keep the initial alignment state, like the case of the OFF time (or black display time). Accordingly, even when the colors of the color filters are different between neighboring pixels, the occurrence of color mixture can be suppressed, and the decrease in color reproducibility or the decrease in contrast ratio can be suppressed.

When misalignment occurs between the array substrate AR and the counter-substrate CT, there are cases in which a difference occurs in the inter-electrode distance between the pixel electrode PE and the common electrodes CE on both sides of the pixel electrode PE. However, since such misalignment commonly occurs in all pixels PX, the electric field distribution does not differ between the pixels PX, and the influence on the display of images is very small. In addition, even when misalignment occurs between the array substrate AR and the counter-substrate CT, leakage of an undesired electric field to the neighboring pixel can be suppressed. Thus, even when the colors of the color filters differ between neighboring pixels, the occurrence of color mixture can be suppressed, and the decrease in color reproducibility or the decrease in contrast ratio can be suppressed.

According to the present embodiment, the first main common electrodes CA1 are opposed to the source lines S, and the second main common electrodes CA2 are opposed to the first main common electrodes CA1. Specifically, the source line S, first main common electrode CA1 and second main common electrode CA2 are arranged in the named order in the normal direction of the liquid crystal display panel LPN. In the case of this structure, the aperture portion AP can be increased and the transmittance of the pixel PX can be improved, compared to the case in which the first main common electrode CA1 and second main common electrode CA2 are disposed on the pixel electrode PE side of a position above the source line S.

In addition, compared to the case in which the first main common electrode CA1 and second main common electrode CA2 are disposed on the pixel electrode PE side of the position above the source line S, the inter-electrode distance between the pixel electrode PE, on the one hand, and the first main common electrode CA1 and second main common electrode CA2, on the other hand, can be increased, and a lateral electric field, which is closer to a horizontal lateral electric field, can be produced. Therefore, a wide viewing angle, which is the advantage of an IPS mode, etc. in the conventional structure, can be maintained.

According to the present embodiment, a plurality of domains can be formed in one pixel. Thus, the viewing angle can optically be compensated in plural directions, and a wide viewing angle can be realized.

The above-described example is directed to the case where the initial alignment direction of liquid crystal molecules LM is parallel to the second direction Y. However, the initial alignment direction of liquid crystal molecules LM may be an oblique direction D which obliquely crosses the second direction Y, as shown in FIG. 3. An angle θ1 formed between the second direction Y and the initial alignment direction D is 0° or more and 45° or less. From the standpoint of alignment control of liquid crystal molecules LM, it is very effective that the angle θ1 is about 5° to 30°, more preferably 20° or less. Specifically, it is desirable that the initial alignment direction of liquid crystal molecules LM be substantially parallel to a direction in a range of 0° or more and 20° or less, relative to the second direction Y.

The above-described example relates to the case in which the liquid crystal layer LQ is composed of a liquid crystal material having a positive (positive-type) dielectric constant anisotropy. Alternatively, the liquid crystal layer LQ may be composed of a liquid crystal material having a negative (negative-type) dielectric constant anisotropy. Although a detailed description is omitted, in the case of the negative-type liquid crystal material, since the positive/negative state of dielectric constant anisotropy is reversed, it is desirable that the above-described formed angle θ1 be within the range of 45° to 90°, preferably the range of 70° or more and 90° or less.

Since a lateral electric field is hardly produced over the pixel electrode PE or common electrode CE even at the ON time (or an electric field enough to drive liquid crystal molecules LM is not produced), the liquid crystal molecules LM scarcely move from the initial alignment direction, like the case of the OFF time. Thus, even if the pixel electrode PE and common electrode CE are formed of a light-transmissive, electrically conductive material such as ITO, little backlight passes through these regions, and these regions hardly contribute to display at the ON time. Thus, the pixel electrode PE and common electrode CE do not necessarily need to be formed of a transparent material, and may be formed of an opaque wiring material such as aluminum, silver or copper.

In the present embodiment, the structure of the pixel PX is not limited to the example shown in FIG. 2 and FIG. 3. In addition, in this embodiment, the second sub-common electrodes CB2, which constitute the common electrode CE, may be omitted.

Next, more concrete examples are described.

Figure 5:
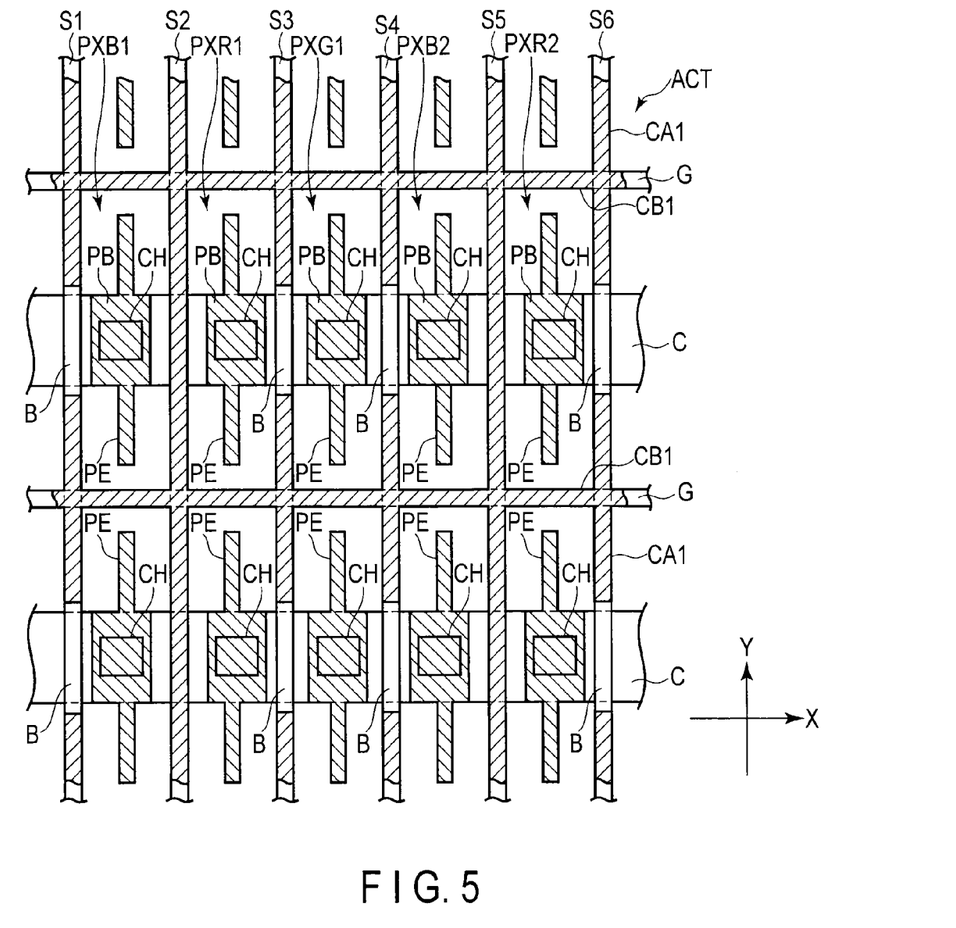
FIG. 5 is a plan view which schematically shows a structure example of an active area in the array substrate shown in FIG. 1.

FIG. 5 is a plan view which schematically shows a structure example of the active area ACT in the array substrate AR. FIG. 5 is a plan view in the X-Y plane.

The illustrated example corresponds to a case in which a blue pixel PXB1, a red pixel PXR1, a green pixel PXG1, a blue pixel PXB2 and a red pixel PXR2 are arranged in the named order in the first direction X. A pixel electrode PE disposed in each pixel is indicated by hatching lines extending in the upper left direction. First main common electrodes CA1 and first sub-common electrodes CB1 are indicated by hatching lines extending in the upper right direction.

Paying attention to the blue pixel PXB1, a sub-pixel electrode PB is displaced from the central part of the pixel toward the left side in FIG. 5. A contact hole CH is located at a central part of the sub-pixel electrode PB, and is displaced toward the left side, like the sub-pixel electrode PB. The first main common electrode CA1, which is located on the right side of the pixel electrode PE and is opposed to a source line S2, extends continuously in the second direction Y, without a gap or discontinuous region. On the other hand, the first main common electrode CA1, which is located on the left side of the pixel electrode PE and is opposed to a source line S1, is discontinuous at a position facing the sub-pixel electrode PB. Specifically, the first main common electrode CA1, which is located on the left side of the pixel electrode PE, includes a discontinuous part B at the position facing the sub-pixel electrode PB. The same applies to the other blue pixel PXB2, and other blue pixels neighboring in the second direction Y.

Paying attention to the red pixel PXR1, the sub-pixel electrode PB is displaced from the central part of the pixel toward the right side in FIG. 5. The contact hole CH is located at the central part of the sub-pixel electrode PB, and is displaced toward the right side, like the sub-pixel electrode PB. The first main common electrode CA1, which is located on the left side of the pixel electrode PE and is opposed to the source line S2, extends continuously in the second direction Y, without a gap or discontinuous region. On the other hand, the first main common electrode CA1, which is located on the right side of the pixel electrode PE and is opposed to a source line S3, is discontinuous at a position facing the sub-pixel electrode PB. Specifically, the first main common electrode CA1, which is located on the right side of the pixel electrode PE, includes a discontinuous part B at the position facing the sub-pixel electrode PB. The same applies to the other red pixel PXB2, and other red pixels neighboring in the second direction Y.

Paying attention to the green pixel PXG1, the sub-pixel electrode PB is located at a substantially central part of the pixel. The contact hole CH is located at the central part of the sub-pixel electrode PB, and is located at the central part of the pixel PX, like the sub-pixel electrode PB. Each of the first main common electrodes CA1, which are located on both sides of the pixel electrode PE, is discontinuous at a position facing the sub-pixel electrode PB. Specifically, each of the first main common electrodes CA1, which are located on both sides of the pixel electrode PE, includes a discontinuous part B. The same applies to other green pixels, although not shown.

Specifically, in the example illustrated, the first main common electrode CA1 between the red pixel and green pixel and the first main common electrode CA1 between the green pixel and blue pixel are discontinuous at positions between the respective sub-pixel electrodes PB. Thereby, a horizontal inter-electrode distance can sufficiently be secured in the first direction X between each sub-pixel electrode PB and each first main common electrode CA1. On the other hand, the first main common electrode CA1 between the red pixel and blue pixel linearly extends in the second direction Y, without being discontinuous in the active area ACT. Thereby, the first main common electrodes CA1 and first sub-common electrodes CB1 of the common electrode, which are provided on the array substrate AR, are electrically connected in the active area ACT, and redundancy is improved. In addition, the first main common electrode CA1 is formed to extend between specific color pixels, i.e. between the red pixel and blue pixel, and electrically connects the first sub-common electrodes CB1 between pixels neighboring in the second direction Y. Red and blue have a lower luminous efficiency than green. Thus, even if display non-uniformity occurs in these specific color pixels, the visibility is low and the effect on the display quality can be reduced.

Figure 6:
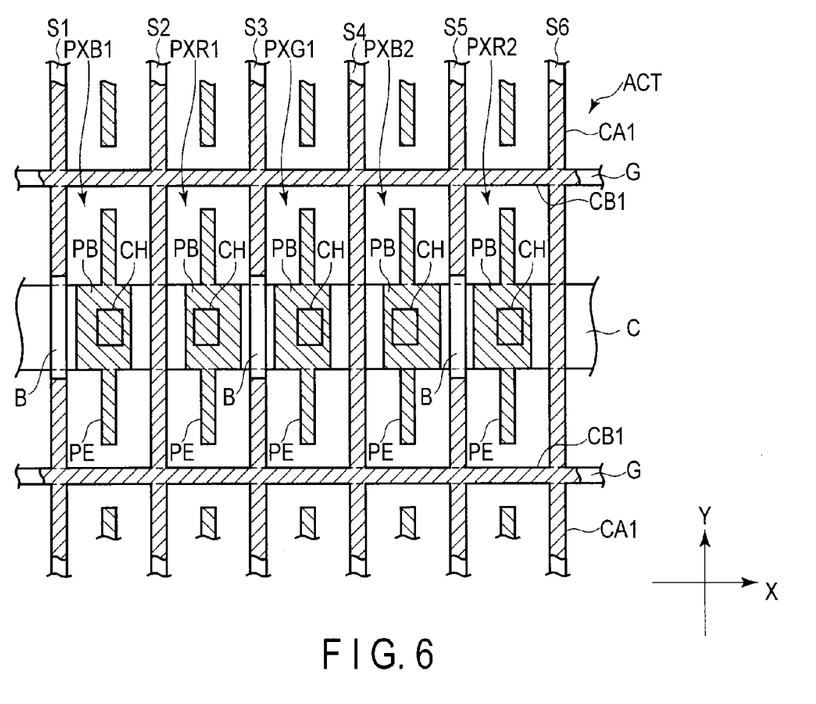
FIG. 6 is a plan view which schematically shows another structure example of the active area in the array substrate shown in FIG. 1.

FIG. 6 is a plan view which schematically shows another structure example of the active area ACT in the array substrate AR. FIG. 6 is a plan view in the X-Y plane.

Paying attention to a red pixel PXR1 and a green pixel PXG1, the first main common electrode CA1, which is located on the left side of the pixel electrode PE of the red pixel PXR1 and opposed to a source line S2, and the first main common electrode CA1, which is located on the right side of the pixel electrode PE of the green pixel PXG1 and opposed to a source line S4, extend continuously in the second direction Y, without a gap or discontinuous region. On the other hand, the first main common electrode CA1, which is located between the red pixel PXR1 and green pixel PXG1 and is opposed to a source line S3, is discontinuous at a position facing the sub-pixel electrode PB. In addition, each of the sub-pixel electrode PB of the red pixel PXR1 and the sub-pixel electrode PB of the green pixel PXG1 is displaced from the central part of the pixel toward the discontinuous part B in FIG. 6. The distance in the first direction X between the sub-pixel electrode PB of the blue pixel PXB1 and the sub-pixel electrode PB of the red pixel PXR1 is equal to the distance in the first direction X between the sub-pixel electrode PB of the blue pixel PXB2 and the sub-pixel electrode PB of the green pixel PXG1, and is greater than the distance in the first direction X between the sub-pixel electrode PB of the green pixel PXG1 and the sub-pixel electrode PB of the red pixel PXR1. In the example illustrated, the contact hole CH of each of the pixels is located at the central part of the pixel.

The distance from the contact hole CH to an intersection part between the source line located on one of both sides of the contact hole CH and the storage capacitance line is substantially equal to the distance from the contact hole CH to an intersection part between the source line located on the other of both sides of the contact hole CH and the storage capacitance line.

The discontinuous part B is provided in every other source line S. By arranging such discontinuous parts B, the distance between the pixel electrode PE and the first main common electrode CA1 can be made greater than the distance between the pixel electrode PE and the discontinuous part B, and therefore short-circuit between the electrodes, which would occur in the fabrication, can advantageously be suppressed.

Figure 7:
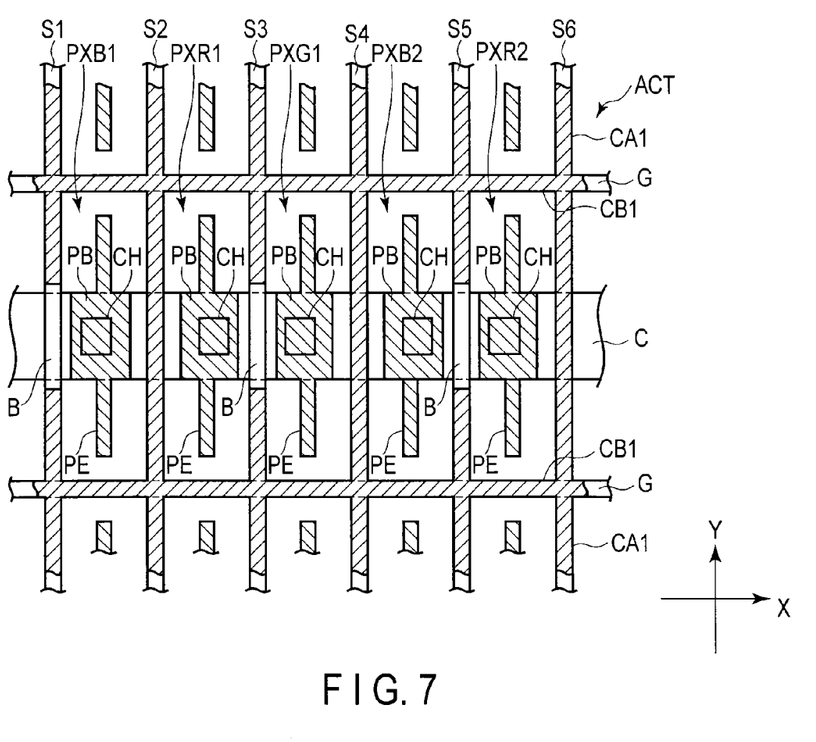
FIG. 7 is a plan view which schematically shows another structure example of the active area in the array substrate shown in FIG. 1.

FIG. 7 is a plan view which schematically shows another structure example of the active area ACT in the array substrate AR. FIG. 7 is a plan view in the X-Y plane.

The example shown in FIG. 7 differs from the example shown in FIG. 6 in that the contact hole CH is displaced toward the discontinuous part B.

Specifically, the distance in the first direction X from the intersection part between the source line, without any gap or discontinuous portion, and the storage capacitance line to the contact hole CH is greater than the distance in the first direction X from the intersection part between the source line including the discontinuous part B and the storage capacitance line to the contact hole CH.

In the case where the contact hole CH is large, relative to the distance between pixels PX, the contact hole CH is displaced from the center line of the pixel PX toward the discontinuous part B. In other words, the center of the contact hole CH is located between the center line of the pixel PX and the discontinuous part B. Alternatively, the distance in the first direction X between the contact holes CH of the neighboring pixels, between which the discontinuous part B is interposed, is smaller than the distance in the first direction X between the contact holes CH of the neighboring pixels, between which the first main common electrode CA1 is interposed. Thereby, even when the pixel electrode PE covers the entirety of the contact hole CH, it is possible to avoid short-circuit occurring between the first main common electrode CA1 and the pixel electrode PE at a time of fabrication in a case where etching is insufficient.

As has been described above, according to the present embodiments, a liquid crystal display device which has a good display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
  a first substrate including
    a first gate line and a second gate line that extend in a first direction,
    a storage capacitance line that extends in the first direction between the first gate line and the second gate line,
    a first source line and a second source line that extend in a second direction crossing the first direction,
    a switching element electrically connected to the first gate line and the first source line,
    an insulation film disposed over the first gate line, the second gate line, the storage capacitance line, the first source line, the second source line and the switching element,
    first main common electrodes disposed on the insulation film and opposed to the first source line and the second source line, the first main common electrodes extend in the second direction and include a discontinuous part in at least one of a first intersection part at an intersection between the storage capacitance line and the first source line and a second intersection part at an intersection between the storage capacitance line and the second source line, a main pixel electrode that extends in the second direction between the first main common electrodes on the insulation film and has a first width in the first direction, a sub-pixel electrode disposed on the insulation film and opposed to the storage capacitance line, the sub-pixel electrode is connected to the main pixel electrode and has a second width in the first direction that is greater than the first width, and a first alignment film covering the first main common electrodes, the main pixel electrode and the sub-pixel electrode;

a second substrate including second main common electrodes opposed to the first main common electrodes, the second main common electrodes extend in the second direction and have a same potential as the first main common electrodes, and a second alignment film covering the second main common electrodes; and a liquid crystal layer held between the first substrate and the second substrate.

2. The liquid crystal display device of claim 1, wherein a distance in the first direction from the main pixel electrode to the first main common electrode located on one side of the main pixel electrode is substantially equal to a distance in the first direction from the main pixel electrode to the first main common electrode located on the other side of the main pixel electrode, a first distance in the first direction from the first intersection part to the sub-pixel electrode is greater than a second distance in the first direction from the second intersection part to the sub-pixel electrode, and the discontinuous part is formed in the second intersection part.

3. The liquid crystal display device of claim 2, wherein the first main common electrode extends continuously through the first intersection part.

4. The liquid crystal display device of claim 3, wherein the first main common electrode has a first line width in the first direction at a position along the main pixel electrode, and has a second line width in the first direction, which is less than the first line width, at the first intersection part.

5. The liquid crystal display device of claim 4, wherein the first substrate further includes first sub-common electrodes disposed on the insulation film and opposed to the first gate line and the second gate line, the first sub-common electrodes extend in the first direction, are connected to the first main common electrodes, and are covered with the first alignment film.

6. The liquid crystal display device of claim 5, wherein the second substrate further includes second sub-common electrodes opposed to the first sub-common electrodes, which are connected to the second main common electrodes, and which are covered with the second alignment film.

7. The liquid crystal display device of claim 6, wherein a contact hole for electrical connection between the switching element and the sub-pixel electrode is formed in the insulation film, and the sub-pixel electrode covers an entirety of the contact hole.

8. The liquid crystal display device of claim 7, wherein the contact hole is located at a central part of the sub-pixel electrode.

9. The liquid crystal display device of claim 7, wherein a distance in the first direction from the contact hole to the first intersection part is substantially equal to a distance in the first direction from the contact hole to the second intersection part, the first intersection part and the second intersection part being located on opposite sides of the contact hole.

10. The liquid crystal display device of claim 7, wherein a third distance in the first direction from the first intersection part to the contact hole is greater than a fourth distance in the first direction from the second intersection part to the contact hole.

11. A liquid crystal display device comprising:

a first substrate including a switching element, an insulation film disposed over the switching element, a main pixel electrode having a first width in a first direction on the insulation film and extending in a second direction crossing the first direction, a sub-pixel electrode disposed on the insulation film, includes a first edge and a second edge that are opposed to each other, and has a second width in the first direction which is greater than the first width, the sub-pixel electrode being connected to the main pixel electrode, first main common electrodes disposed on the insulation film and extending in the second direction on both sides of the main pixel electrode, the first main electrodes including a discontinuous part facing at least one of the first edge and the second edge, and a first alignment film covering the first main common electrodes, the main pixel electrode and the sub-pixel electrode;

a second substrate including second main common electrodes opposed to the first main common electrodes, the second main common electrodes extend in the second direction and have a same potential as the first main common electrodes, and a second alignment film covering the second main common electrodes; and a liquid crystal layer held between the first substrate and the second substrate.

12. The liquid crystal display device of claim 11, wherein a distance in the first direction from the main pixel electrode to the first main common electrode located on one side of the main pixel electrode is substantially equal to a distance in the first direction from the main pixel electrode to the first main common electrode located on the other side of the main pixel electrode, a first distance in the first direction from the first edge to the main pixel electrode is less than a second distance in the first direction from the second edge to the main pixel electrode, and the discontinuous part is formed at a position facing the second edge.

13. The liquid crystal display device of claim 12, wherein the first main common electrode extends through a position facing the first edge.

14. The liquid crystal display device of claim 13, wherein the first main common electrode has a first line width in the first direction at a position along the main pixel electrode, and has a second line width in the first direction, which is less than the first line width, at the position facing the first edge.

15. The liquid crystal display device of claim 14, wherein the first substrate further includes first sub-common electrodes disposed on the insulation film, the first sub-common electrodes extend in the first direction on both sides of the sub-pixel electrode, are connected to the first main common electrodes, and are covered with the first alignment film.

16. The liquid crystal display device of claim 15, wherein the second substrate further includes second sub-common electrodes opposed to the first sub-common electrodes, the second sub-common electrodes are connected to the second main common electrodes and are covered with the second alignment film.

17. The liquid crystal display device of claim 16, wherein a contact hole for electrical connection between the switching element and the sub-pixel electrode is formed in the insulation film, and the sub-pixel electrode covers an entirety of the contact hole.

18. A liquid crystal display device comprising:
a first substrate including
  a gate line and a storage capacitance line that extend in a first direction,
  a source line that extends in a second direction crossing the first direction,
  a switching element electrically connected to the gate line and the source line,
  an insulation film disposed over the switching element and in which a contact hole reaching the switching element is formed,
  a sub-pixel electrode disposed on the insulation film and opposed to the storage capacitance line, the sub-pixel electrode extending in the first direction and covering an entirety of the contact hole,
  a main pixel electrode that extends in the second direction on the insulation film and is connected to the sub-pixel electrode,
  a first main common electrode disposed on the insulation film and opposed to the source line, the first main common electrode extending in the second direction and including a discontinuous part at an intersection between the storage capacitance line and the source line, and
  a first alignment film covering the first main common electrode, the main pixel electrode and the sub-pixel electrode;
a second substrate including
  a second main common electrode opposed to the first main common electrode, the second main common electrode extending in the second direction and having a same potential as the first main common electrode, and
  a second alignment film covering the second main common electrode; and
a liquid crystal layer held between the first substrate and the second substrate,
wherein a center of the contact hole is located between a center line of the main pixel electrode and the discontinuous part.

19. The liquid crystal display device of claim 18, wherein a distance in the first direction from the main pixel electrode to the first main common electrode located on one side of the main pixel electrode is substantially equal to a distance in the first direction from the main pixel electrode to the first main common electrode located on the other side of the main pixel electrode.

20. The liquid crystal display device of claim 19, wherein the first substrate further includes first sub-common electrodes disposed on the insulation film, the first sub-common electrodes extend in the first direction on both sides of the sub-pixel electrode, are connected to the first main common electrode, and are covered with the first alignment film.

21. The liquid crystal display device of claim 20, wherein the second substrate further includes second sub-common electrodes opposed to the first sub-common electrodes, the second sub-common electrodes are connected to the second main common electrode and are covered with the second alignment film.

* * * * *